United States Patent [19]

Nakai et al.

[11] 3,980,272

[45] Sept. 14, 1976

[54] FIRE SMOKE DAMPER

[75] Inventors: Takao Nakai, Takarazuka; Isamu Shimonomura, Kodaira; Isao Nakayama, Itami; Yoshiyuki Yoshii, Kawanishi, all of Japan

[73] Assignee: Nittan Company, Limited, Japan

[22] Filed: Jan. 15, 1975

[21] Appl. No.: 541,160

[30] Foreign Application Priority Data

Oct. 9, 1974 Japan .................................. 49/121229
May 16, 1974 Japan .................................. 49/55003
June 7, 1974 Japan .................................. 49/65386

[52] U.S. Cl. .......................... 251/306; 169/48; 277/161
[51] Int. Cl.² ..................................... F16K 1/228
[58] Field of Search ............. 169/48, 49, 65; 251/307, 306; 277/160, 161

[56] References Cited
UNITED STATES PATENTS

| | | | |
|---|---|---|---|
| 1,903,107 | 3/1933 | Grant | 277/160 |
| 3,384,340 | 5/1968 | Fawkes | 251/307 |
| 3,552,407 | 1/1971 | Hirano | 251/307 X |
| 3,554,216 | 1/1971 | Piguet | 251/307 X |
| 3,586,290 | 6/1971 | Null | 251/306 |
| 3,633,872 | 1/1972 | Wright | 251/306 |

*Primary Examiner*—Evon C. Blunk
*Assistant Examiner*—Michael Mar
*Attorney, Agent, or Firm*—Eugene E. Geoffrey, Jr.

[57] ABSTRACT

A fire and smoke damper for installation in a duct which includes a plate rotatably mounted within the duct and having means enclosing the periphery of the plate and biased outwardly to engage the duct wall when the damper is in the closed position.

3 Claims, 12 Drawing Figures

FIRE SMOKE DAMPER

This invention relates to a fire and smoke damper and more particularly to a novel and improved damper disposed in an air-conditioning duct, and which at the time of fire outbreak, may be closed to prevent the fire and smoke from spreading through the duct.

Prior fire smoke dampers of this kind have generally a so-called butterfly valve structure, including a rotatable shaft and a flat vane fixed thereto. Such type of conventional fire smoke dampers may suffer from a lack of air-tightness in the closed condition, which may be inherent in the design or caused during use by heavy contamination with dust and lint in the duct. Although various measures have been proposed for overcoming this disadvantage of prior fire and smoke dampers, they are not effective enough for solving this problem.

Accordingly, an object of this invention is to provide an improved fire and smoke damper which is highly durable and can maintain sufficient air-tightness throughout a long period of use regardless of dust contamination.

According to a feature of this invention, the fire and smoke damper comprises a tubular casing, a rotatable shaft disposed across the cross-section of the casing, a flat vane having a contour which is a little less than said cross-section and being fixed to the shaft, a peripheral member or members attached to the periphery of the vane so as to be movable radially, and means of pressing the peripheral member or members radially against the inner wall of the casing.

Other features and operation of this invention will be described in detail hereinunder in conjuction with certain embodiments and with reference to the accompanying drawings.

In the drawings:

FIGS. 1a and b are a longitudinal cross sectional view and a front view, respectively, of a fire and smoke damper of the prior art;

FIG. 2 is a cross-sectional view of a modified embodiment of a prior art structure;

FIGS. 3a and b are a longitudinal cross sectional view and a front view, respectively, of an embodiment of the fire and smoke damper according to this invention;

FIG. 4 is a fragmentary cross sectional view of a portion of FIG. 3a in magnification;

FIGS. 5a and b are a longitudinal cross sectional view and a front view, respectively, of another embodiment of the fire and smoke damper according to this invention;

Throughout the drawings, like reference numerals are used to denote like structural components.

Figure 1A:
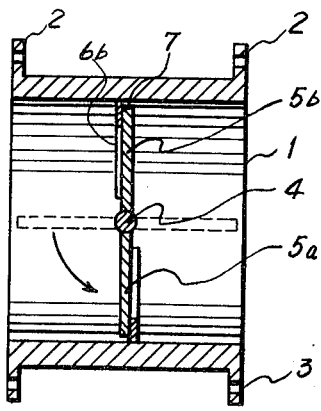

Referring to FIGS. 1a and b representing a conventional type of prior art, the damper consists of a cylindrical casing 1 having flanges 2 at each end. Each of the flanges 2 has a plurality of holes 3 about the periphery for coupling it to the flange of a corresponding duct. A rotatable shaft 4 is disposed along the diameter of the casing 1 and a pair of semicircular vanes 5a and 5b are fixed in a same plane to the shaft 4. A little gap 7 is generally provided between the casing 1 and the vanes 5a and 5b so as to prevent the vanes from being blocked by friction with the inner wall of the casing 1, especially when dust and dirt accumulate on the inner wall. On the opposing sides of the vanes 5a and 5b, semiannular members 6a and 6b respectively are fixed to the inner wall of the casing 1. The members 6a and 6b function as stops for the vanes and also close the gap 7.

Figure 1B:
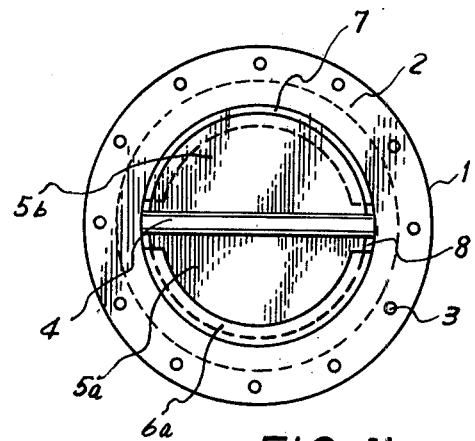

Although the vanes 5a and 5b are shown in the vertical closed position, they are normally in the horizontal position as shown by the dashed line and, in an emergency, are closed by manually or automatically operating the shaft 4 from the outside. As the cross-sectional area of the airflow path is limited by the members 6a and 6b their widths will provide significant aerodynamic resistance to the air circulation and therefore they must be as narrow as possible. Accordingly, the closure of the gap 7 with the stopping members 6a and 6b in case of emergency becomes naturally insufficient, especially when heavy dust lies thereon. According to this structure, moreover, it is unavoidably necessary to leave a considerable gap 8 (FIG. 1b) between the each end of the semi-annular members and the shaft, which would greatly affect the air-tightness of the damper.

Figure 2:
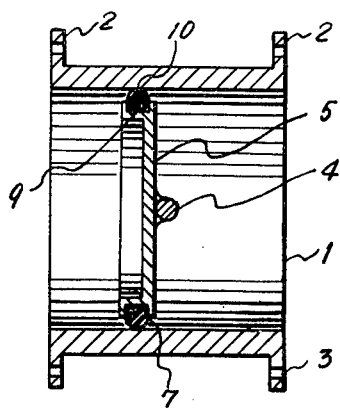

FIG. 2 shows another type of prior fire and smoke damper, which constitutes somewhat of an improvement over that of FIG. 1. In this type, a circular disc 5 having a circumferential groove 9 is fixed to a rotatable shaft 4 such that the shaft is parallel to the disc but not in the plane of the disc so that the circumferential groove is not blocked by the shaft. Although the diameter of the disc 5 is a little less than that of the inner wall of the casing 1 and there is some clearance 7 between the disc and the inner wall, an O-ring 10 is fitted in the groove 9 of the disc 5 to fill this clearance 7. This structure can provide complete air-tightness but is inferior in its heat-resistant and refractory properties due to the material of the O-ring 10 which may be natural rubber or synthetic resin.

Figure 4:
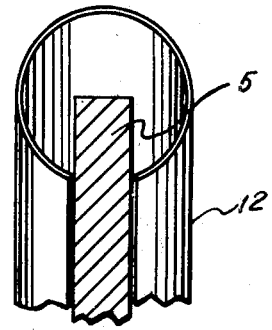
Figure 3A:
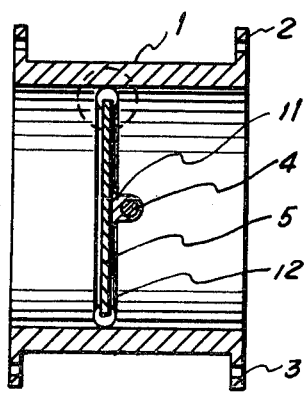
Figure 3B:
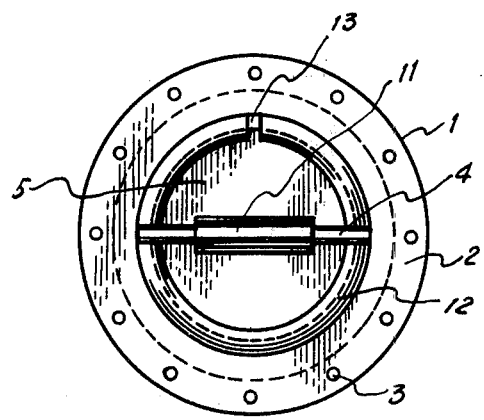

Referring now to FIGS. 3a and b representing one embodiment of this invention, the damper includes a cylindrical casing 1 and a diametric rotatable shaft 4 which are quite similar to those of prior art. A circular vane plate 5 is fixed to the shaft 4 through a bracket 11 so as to separate the shaft from the vane plate. The peripheral edge of the vane 5 is adequately spaced from the inner wall of the casing 1 and a peripheral member 12 according to this invention is disposed therebetween. The peripheral member 12 is preferably made from a long and thin rectangular stainless steel sheet. The sheet is bent longitudinally into a round tube having a C-shaped cross-section and the tube is again bent into a ring having an outer diameter a little greater than the inner diameter of the casing 1 and an inner diameter a little less than the diameter of the vane 5, directing the slot of "C" inwardly. Then, the ring thus formed is placed in engagement with the peripheral edge of the vane plate 5 so that the plate extends into the circumferential slot of the ring as shown distinctly in FIG. 4 which is a magnification of a part of FIG. 3a as shown in the dashed circle. When this assembly is positioned in the casing 1, the peripheral member 12 is pressed against the inner wall of the casing 1 by its own resiliency and, if the gap 13 (FIG. 3b) between the facing ends of the ring member 12 is made sufficiently small, a high grade of air-tightness can be obtained.

Figure 5A:
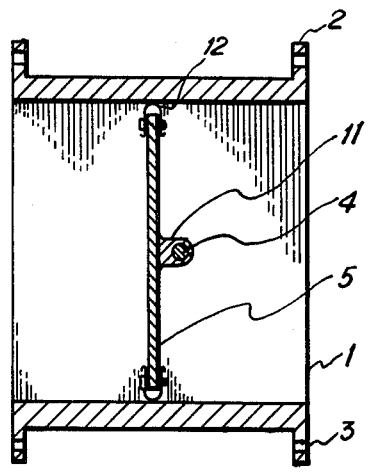
Figure 5B:
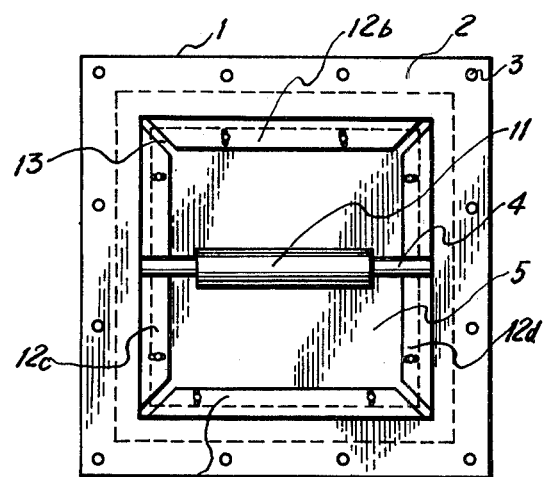
Figure 6:
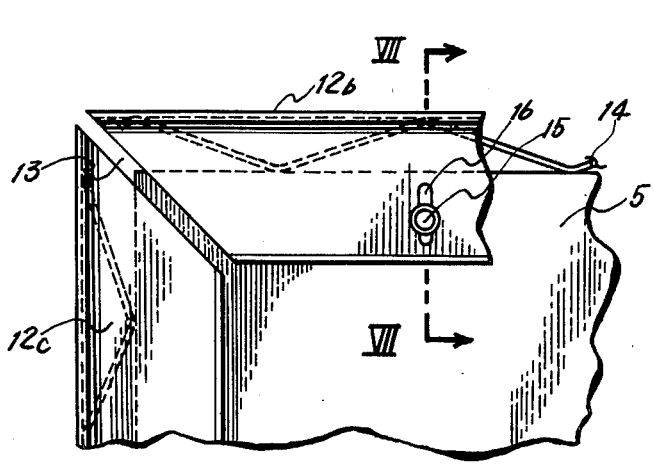
FIG. 6 is an enlarged fragmentary portion of the embodiment of the invention shown in FIG. 5b.
Figure 7:
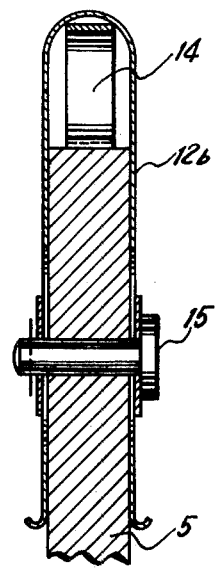
FIG. 7 is an enlarged cross sectional view taken along the line VII—VII of FIG. 6.

Another embodiment of this invention will be described next with reference to FIGS. 5, 6 and 7. This device is suited for coupling with a square duct and has a casing 1 having a square cross-section. A rotatable shaft 4 is disposed across the center of the cross-section of the casing 1 and a square vane plate 5 having a contour a little smaller than the cross-section of the casing is fixed through a bracket 11 to the shaft 4 so as to be a little apart from the shaft. In contrast with the peripheral member 12 of the foregoing embodiment as shown in FIG. 3, four peripheral members 12a, 12b, 12c and 12d are placed over the four side edges of the vane plate 5. As shown in detail in FIGS. 6 and 7, and each peripheral member has a U-shape cross-section and is attached to the vane plate 5 with pins 15 passing slots 16 formed in the peripheral member, so that it is freely movable outwardly from the side of the vane. A wave-shaped leaf spring 14 is located between each peripheral member and the vane edge so as to always move the peripheral member outwardly against the inner wall of the casing 1. As in the case of the foregoing embodiment, a high grade of air-tightness is obtainable by making the gap 13 (FIG. 6) between the adjoining peripheral members sufficiently small.

Figure 8A:
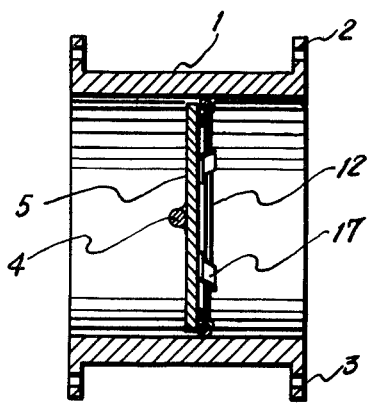
FIGS. 8a and b are views analogous to FIGS. 3a and b, representing a modified embodiment of this invention.
Figure 8B:
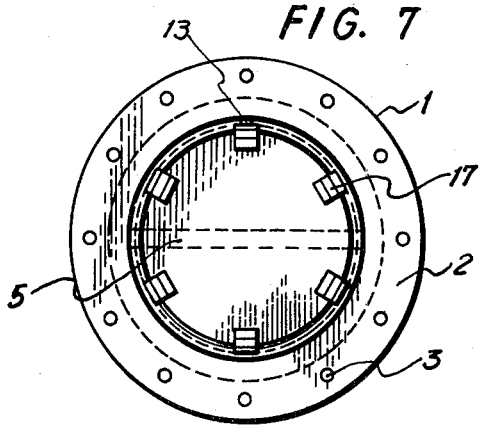

The third embodiment shown in FIGS. 8a and b is a modification of the first embodiment of FIGS. 3a and b. In this embodiment, an annular ring 12 which is made of a metal rod having a circular cross-section is adopted as the peripheral member, instead of the ring member 12 having a C-shaped cross-section in the first embodiment. The material of the annular ring 12 may be rustless spring metal such as stainless steel and the ring 12 is attached to the vane 5 with a plurality of spring fixtures 17. As in the case of the first embodiment, the butting ends of the ring 12 are not joined but a gap 13 is provided therebetween so that the ring 12 can expand outwardly by its own resiliency to intimately contact with the inner wall of the casing 1. As compared with the ring member 12 of the first embodiment, this annular ring can be made easily and at low cost and this feature is especially exhibited when the diameter of the vane 5 is rather small.

According to this invention, a highly durable and refractory damper is available since the all components including the peripheral member 12 can be made of stiff refractory metal such as stainless steel. Moreover, as the peripheral member or members 12 are always urged resiliently into contact with the inner wall of the casing 1, the air-tightness is sufficiently kept even if heavy dust lies on the wall.

It should be noted that the above-described embodiments are given only for illustrative purposes and various modifications or changes can be made in accordance with the invention without departing from the scope thereof which is defined in the appended claims.

What is claimed is:

1. A fire and smoke damper comprising a tubular casing, a rotatable transversely disposed shaft disposed within the casing, a vane plate fixed to said shaft for rotation therewith to open and closed positions, the periphery of said plate being slightly smaller than the inside of said casing to form a gap therebetween and a peripheral structure slidably engaging the periphery of said vane plate and enclosing the peripheral edge thereof, said peripheral structure being biased outwardly to close said gap when the vane plate is in the closed position.

2. A fire smoke damper according to claim 1 wherein said peripheral structure is of generally U-shaped cross section.

3. A fire smoke damper according to claim 1 including a spring disposed within said peripheral member and bearing against the edge of said vane plate to urge said peripheral structure outwardly.

* * * * *